United States Patent

[11] 3,614,578

| [72] | Inventors | Benjamin W. Woodward<br>Kenmore;<br>John J. Allard, Buffalo, both of N.Y. |
|---|---|---|
| [21] | Appl. No. | 886,887 |
| [22] | Filed | Dec. 22, 1969 |
| [45] | Patented | Oct. 19, 1971 |
| [73] | Assignee | Sherry Rand Corporation<br>New York, N.Y. |

[54] CLOSED LOOP ON-OFF CONTROL SYSTEM FOR DC MOTORS INCLUDING DYNAMIC BRAKING
10 Claims, 7 Drawing Figs.

[52] U.S. Cl. ................................................ 318/673,
318/612, 318/345, 318/467
[51] Int. Cl. .................................................. G05b 11/14
[50] Field of Search ........................................... 318/612,
673, 345, 467

[56] References Cited
UNITED STATES PATENTS
2,471,075  5/1949  Montrose-Oster ........... 318/(20.410)

| 3,119,957 | 1/1964 | Alexanderson............... | 318/345 X |
| 3,241,024 | 3/1966 | Schade et al.................. | 318/345 X |
| 3,360,702 | 12/1967 | Lasley et al................ | 318/(20.810.5 X) |
| 3,437,895 | 4/1969 | Peters......................... | 318/(20.810.5 X) |
| 3,441,824 | 4/1969 | Rudisch et al. ............ | 318/(20.810.5 X) |
| 3,454,855 | 8/1969 | Morlen....................... | 318/(20.810.5 X) |
| 3,478,254 | 11/1969 | Lofrisco et al............ | 318/(20.810.5 X) |

*Primary Examiner*—T. E. Lynch
*Attorneys*—Frank A. Seemar, Marshall M. Truex and Thomas P. Murphy ABSTRACT: A network of electronic circuitry elements connected to form a system for controlling a DC motor. The principles of dynamic braking are applied in an arrangement adapted to perform several control functions, during which the motor becomes a self-excited generator dissipating stored energy in braking elements connected across the armature via various paths. Selection of the current path through the braking elements is controlled by condition responsive devices included in the system.

PATENTED OCT 19 1971

INVENTORS
BENJAMIN W. WOODWARD
JOHN J. ALLARD

BY Frank A. Seemar
ATTORNEY

PATENTED OCT 19 1971 3,614,578

CLOSED LOOP ON-OFF CONTROL SYSTEM FOR DC MOTORS INCLUDING DYNAMIC BRAKING

BACKGROUND OF THE INVENTION

The present invention relates to a motor control system and more particularly to an improved system for minimizing DC motor overspeed, as well as for obviating sudden stops by controlling accurate slow down and stop functions.

There are various types of equipment and apparatus on the market today that employ a motor driven system in which accurate shaft control is essential. For example, in conveyor driven storage and retrieval equipment of the type shown in U.S. Pat. No. 3,202,265, issued on Aug. 24, 1965, and entitled "Conveyor Assembly for Conveyor Driven Equipment," it is indeed desirable that the drive motor be controlled to effect a stop such that a selected carrier is accessible at the work station with a high degree of accuracy. Briefly stated, the patent discloses mechanized retrieval equipment comprising a plurality of carriers suspended from a chain roller-type conveyor operatively mounted in a housing having a convenient access opening adjacent a work station. The necessity of accurate positioning becomes apparent when consideration is given to the fact that slight mispositioning of a retrieved carrier would in many instances obviate access thereto, or at best lead to inconvenient operation.

Another exemplary situation in which accurate motor control is a necessary requisite is illustrated by reference to U.S. Pat. No. 3,235,319, issued on Feb. 15, 1965, and entitled "Article Storage Equipment." This patent also relates to conveyor driven storage and retrieval equipment of the type discussed above and further contemplates an automatic extraction feature. Several small receptacles are accommodated by each carrier and a horizontally disposed extraction mechanism at the work station is adapted to engage for withdrawal the front surface of receptacles positioned adjacent the work station. The extraction mechanism automatically withdraws and returns receptacles from and to a carrier that has been accurately positioned at an access opening, adjacent the work station. In the event a carrier is not positioned with a fine degree of accuracy, the selected receptacle or receptacles would not properly cooperate with the extraction mechanism, resulting in improper operation.

A skilled artisan, or even a layman, would appreciate that many inherent problems are encountered by the designer of a motor control system for driving apparatus of the exemplary nature discussed above. In fact, several of the problems solved by the present invention were encountered during the design of a control system for the type article handling apparatus mentioned. However, it will become apparent that their novel solution is not unique to any specific system and accordingly the control network to which the present invention is directed will only be limited in scope to the extent set forth by the appended claims.

One particular problem presents itself in the illustrated storage and retrieval equipment due to the fact that large unbalanced loads will from time to time be present. At extreme imbalanced condition is brought about where all media is withdrawn from a carrier which is diametrically opposite a completely stocked carrier. More specifically, the degree of imbalance depends on the ratio of the load on one side of the conveyor with respect to the load on the other side of the conveyor regardless of the overall load. This load imbalance, which is continuously variable, is reflected in the torque impressed on the motor drive for the system and, accordingly, must be given due consideration during design of the control system. Thus, the affects of momentum and inertia become important factors in determining the control requirements.

An object of the present invention is to provide a novel motor control network adaptable for use in systems of the type having the characteristics discussed above.

Another object is to provide a reliable motor control network in which dynamic braking principles are employed to prevent an excessive overspeed condition and facilitate smooth slow down and stop functions of associated apparatus in which it is desirable that imbalanced loads be accurately and rapidly positioned.

BRIEF SUMMARY OF THE INVENTION

The present invention contemplates a novel system for controlling a DC motor. Principles of dynamic braking are uniquely employed to provide reliable motor operation under imbalanced load conditions. One embodiment of the system comprises in combination a DC motor having a shaft, armature, and field windings, an AC power source, a rectifier connecting the power source to the motor armature and field for unidirectional energization thereof, a sensing device for sensing shaft position, an input mechanism coupled to the sensing device for selecting a desired shaft position, and a network of elements operatively associated with the rectifier and the input mechanism for permitting motor energization to effect drive of the shaft to a selected position from its sensed position. The system further includes a resistive load and novel means for connecting the resistive load in series with a section of the field winding and the armature under overspeed conditions or when the sensed shaft position is approaching the position selected by the input mechanism.

The foregoing and other objects, features, and advantages of the present invention will appear more fully hereinafter from a consideration of the detailed description which follows, in conjunction with the accompanying drawings wherein one embodiment of the invention is illustrated by way of example.

DESCRIPTION OF THE PREFERRED EMBODIMENT

Figure 1:
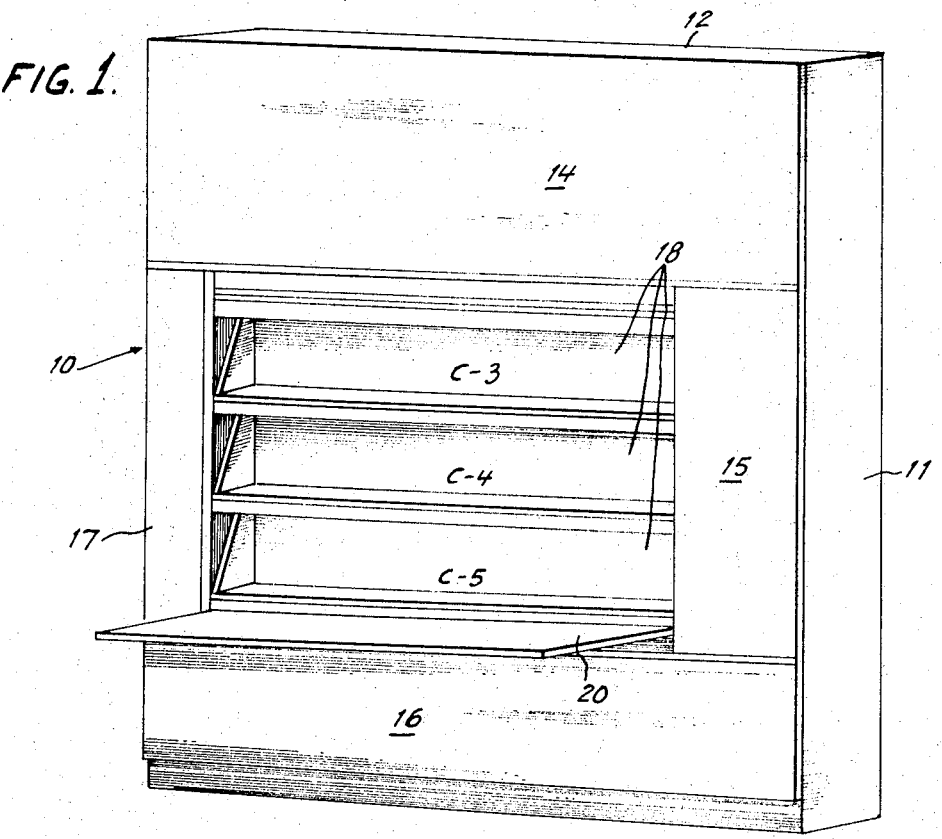
FIG. 1 is a perspective view of a mechanized article storage unit in which the present invention may be readily employed.

Now referring to the drawings for a more detailed description, FIG. 1 shows an article handling unit, generally designated by reference numeral 10, in which the present invention may be readily embodied. Unit 10 is generally rectangular in configuration and includes two sidewalls 11 (only one shown), a top 12, a rear wall 13 (see FIG. 2), and a front comprising contiguous rectangular panels 14, 15, 16 and 17, defining a rectangular opening through which a plurality of like carriers, generally designated by reference numeral 18, are selectively accessible. A posting board 20 extends outwardly from the bottom edge of the access opening to provide a convenient work area for an operator stationed thereat.

Figure 2:
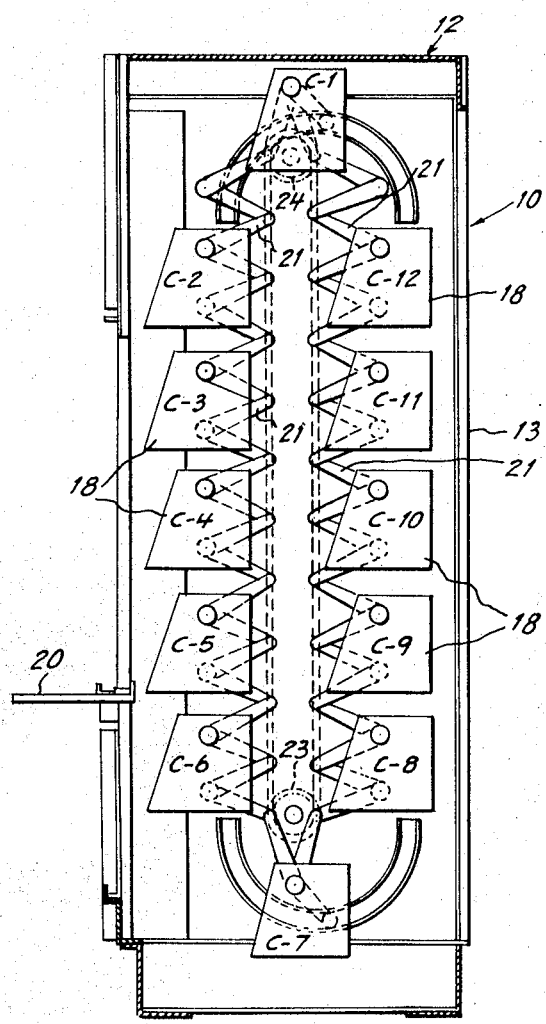
FIG. 2 is a side elevational view partly depicting the conveyor mechanism of the unit shown in FIG. 1.

As best seen in the side elevational view of unit 10 at FIG. 2, the conveyor assembly more specifically comprises 12 carriers 18, each suspended from a like arm 21, which is pivotally attached to a conveyor chain 22 (shown in phantom outline), guided about a pair of spaced sprocket wheels 23 and 24 (also shown in phantom). A similar suspension mechanism is disposed at the opposite end of unit 10, whereby the carriers 18 are guided in an oval path past the access opening. To individually identify carriers 18, further reference designations C-1 through C-12 are used.

The present invention is adapted to control a motor drive system for apparatus of the nature described, whereby a carrier may be accurately stopped at an exact position adjacent posting board 20. Further details of this type apparatus are shown and described in the two above-mentioned patents, and insofar as unit 10 is only shown as an example of environment, no further discussion is deemed necessary as to detailed aspects thereof.

Figure 3:
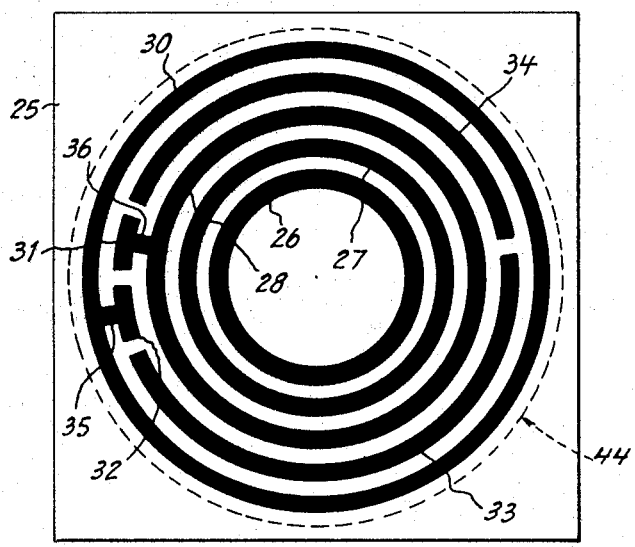
FIG. 3 is a plan view showing the ring configuration for a commutator of the type commonly used in units of the type shown in FIG. 1.
Figure 4:
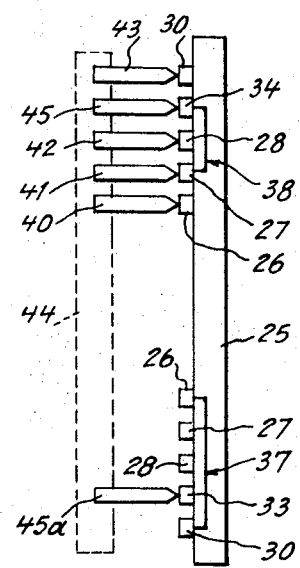
FIG. 4 is a schematic illustration of the commutator brush arrangement.

Now turning to FIGS. 3 and 4 a schematic illustration showing a commutator arrangement of the type commonly used in mechanized equipment for which the present system is adapted. The commutator comprises a nonconductive rotatably mounted base member 25 upon which are mounted a plurality of concentric conductive elements. The elements comprise four continuous copper rings designated by reference numerals 26, 27, 28 and 30 respectively, and a fifth segmental ring including segments, 31, 32, 33 and 34. The shorter segments, 31, and 32, are electrically connected to rings 30 and 28 by interconnecting elements 35 and 36, respectively; whereas, segments 33 and 34 are connected to rings 26 and 27, respectively, by jumper wires 37 and 38 embedded in base 25, as shown in FIG. 4.

Rings 26, 27, 28 and 30 have brushes 40, 41, 42 and 43 in sliding contact therewith and are mounted in a fixed brush holder 44, diagrammatically shown in broken lines for the purposes of the present description. The segmented commutator ring has a plurality of brushes riding thereon, equal in number to the number of desired stopping position, i.e., each carrier 18 (FIG. 2) must stop adjacent posting board 20 in the present example. Therefore, 12 brushes would be equidistantly distributed in a circular array to engage segments 31, 32, 33 and 34 in the manner illustrated by brushes 45 and 45a in FIG. 4. The commutator thus operates in a conventional manner and one cycle of the conveyor corresponds to one rotation of base member 25 with respect to the fixed brush assembly. To this end, an appropriate reduction assembly is used to couple the drive motor to the conveyor, e.g., a gear train or a sprocket and chain. The commutator is electrically illustrated at FIG. 5 and its detailed operation will become apparent when the description of the circuit diagrams (FIGS. 5 and 6) are described.

Figure 5:
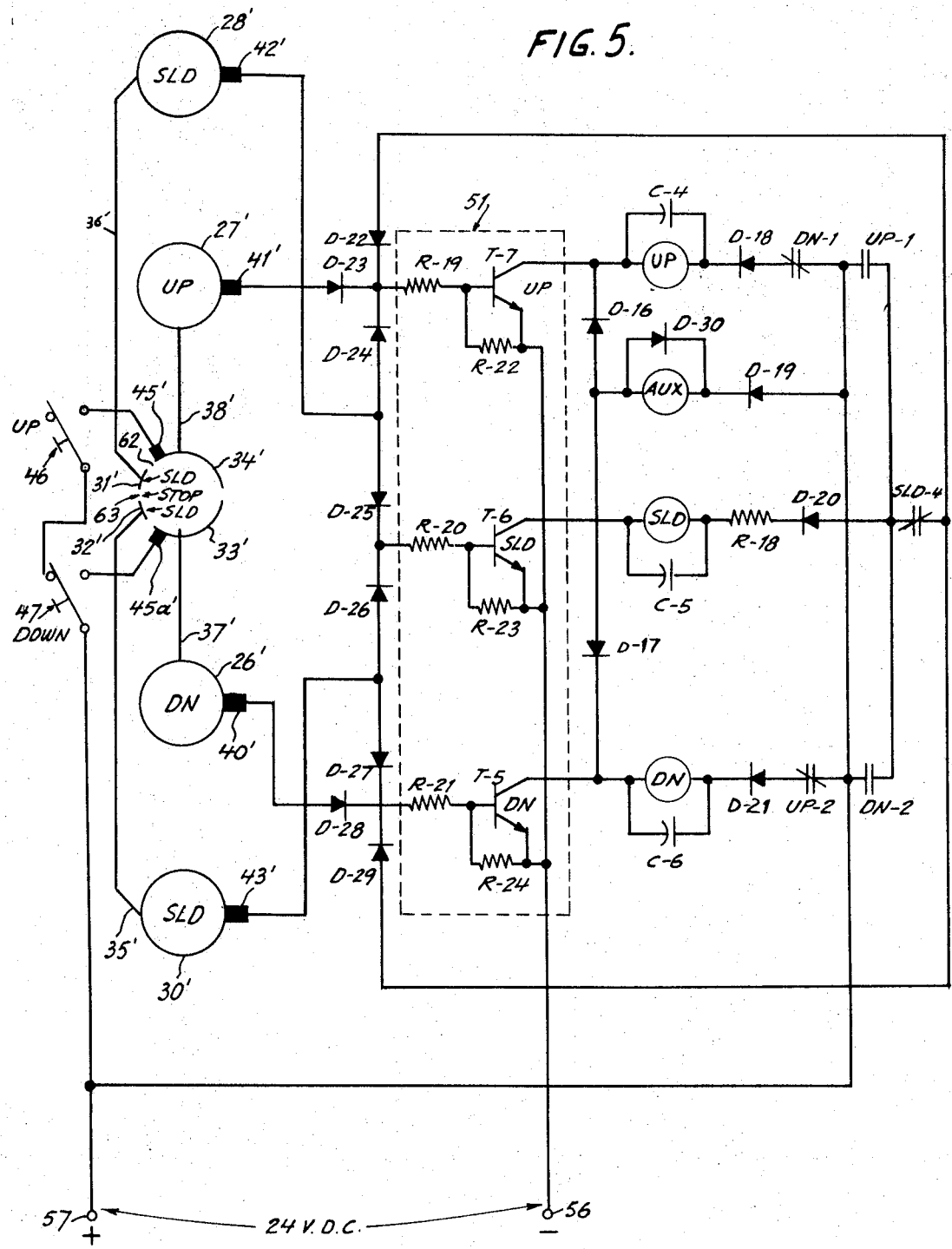
FIG. 5 is a schematic diagram showing the commutator and other associated elements.

Insofar as actual operator input commands are concerned, FIG. 5 of the drawing shows an abbreviated keyboard, depicting illustrative pushbuttons 46 and 47, further designated by "UP" and "DOWN," in normal nondepressed condition. In actual practice, the number of pushbuttons corresponds to the number of carriers, i.e., the number of commutator stop positions. For the purposes of this invention, it is only necessary to show two pushbuttons to illustrate the bidirectional nature of the control system. In the unit described, direction is determined by the actual rest position of a selected carrier to assure shortest travel excursion. For example, if carrier C-2 were selected (FIG. 2), the conveyor would be driven in the down direction to translate carrier C-2 to the position at which carrier C-5 is resting. Likewise, if carrier C-7 were selected, the conveyor would be driven in an upward direction. This shortest travel excursion feature is common in equipment of the type described.

Figure 7:
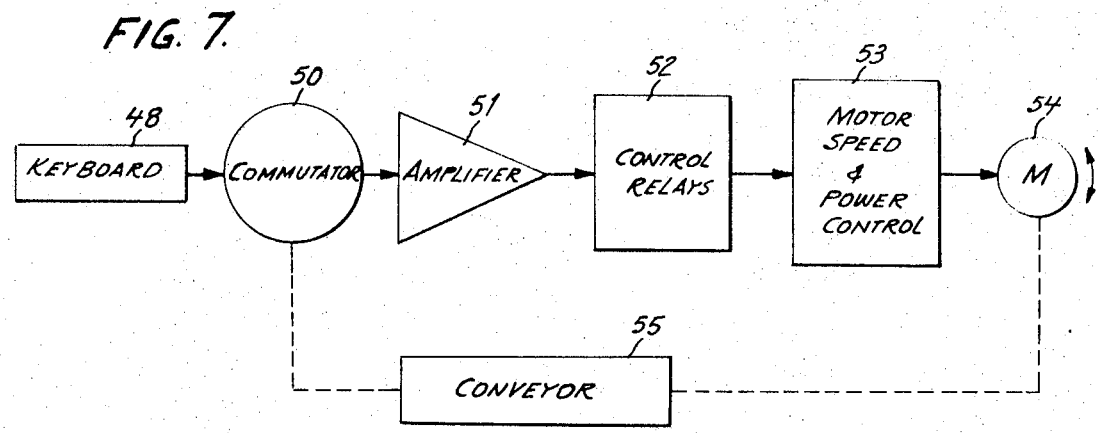
FIG. 7 is a block diagram showing the relationship of various portions of the control system for the unit disclosed.

FIG. 5 further shows the commutator rings in exploded, or side-by-side, schematic fashion to clearly relate these rings to the keyboard and other associated control system elements. The system is shown in further detail at FIG. 6 wherein a schematic network depicts the motor and various electronic switching and impedance elements connected in a novel array. In FIG. 7 a block diagram shows the relationship of various system blocks. A keyboard 48 is connected to provide input to commutator 50 which transfers information via an amplifier section 51 to a control relay block 52, which in turn effectively operates the motor speed and power control circuitry 53 to drive motor 54. The rotation of a conveyor unit 55 is sensed by commutator 50 to provide feedback information as to actual position. Generally speaking, keyboard 48 comprises pushbuttons 46 and 47 (FIG. 5); the commutator block 50 includes rings 26, 27, 28 and 30, as well as segments 31, 32, 33 and 34 along with the various brushes and other associated elements discussed hereinabove (FIGS. 3, 4 and 5); amplifier 51 comprises transistors T5, T6 and T7 (FIG. 5) and related elements; control relay block 52 includes relays, UP, AUX, SLO and DN; and motor speed and power control block 53 is generally representative of the FIG. 6 network.

Contacts associated with the several relay coils throughout the system are shown in normal condition and are designated by numerals prefixed by letters corresponding to the coil designation. For example, contacts operated by coil UP include UP-1, UP-2, etc. (FIGS. 5 and 6).

Figure 6:
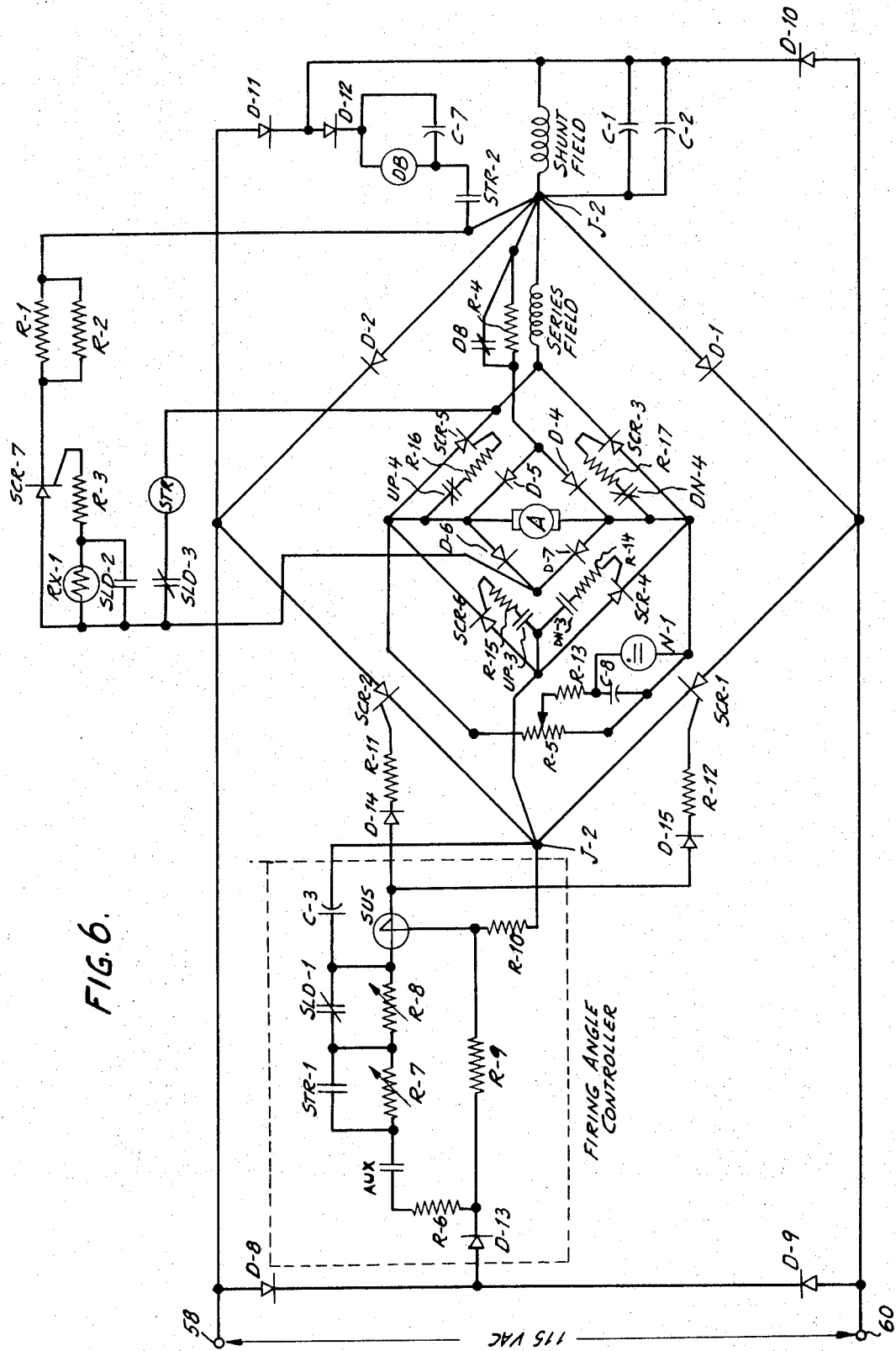
FIG. 6 is a detailed schematic diagram showing the electronic elements comprising the control network for one embodiment of the present invention.

Typical values for many of the elements shown in FIG. 6 are set forth in the following chart, and are representative of actual values for like elements in a working embodiment of the present invention.

| ELEMENT(S) | VALUE |
| --- | --- |
| R-1, R-2 | 50 Ohms |
| R-3 | 1,000 Ohms |
| R-4 | 4 Ohms |
| R-5 | 500 K Ohms |
| R-6 | 4.8 K Ohms |
| R-7, R-8 | 500 K Ohms (Variable) |
| R-9 | 33 K Ohms |
| R-10 | 15 K Ohms |
| R-11, R-12 | 100 Ohms |
| R-13 | 47 K Ohms |
| R-14, R-15 | 1,000 Ohms |
| R-16, R-17 | 100 Ohms |
| C-1, C-2 | 300 Microfarads |
| C-3 | 0.22 Microfarads |
| C-8 | 0.1 Microfarads |

For the purpose of clarity, the elements of commutator 50 are referred to by primed numeral designations (FIG. 5), corresponding to like elements shown by the commutator of FIGS. 3 and 4. As mentioned above, the brush structure remains stationary with respect to the rings (and segments) which are rotatable as a unit with respect to the stationary brushes. It was further noted that only two pushbuttons and two carrier brushes are shown in FIG. 5 but in actual practice the number of pushbuttons and associated brushes would correspond to the number of actual stop positions for the commutator. More specifically, the brushes positioned on segment 34' initiate an UP function whereas those brushes positioned on segment 33' initiate a DOWN function; therefore, the UP and DOWN pushbuttons are sufficient for the purposes of this description to illustrate the two possible functions regardless of the number of positions. To wit, when the UP pushbutton is depressed, a circuit will be made through the keyboard to segment 34' of the commutator. Under ordinary conditions the commutator rings commence to rotate in a clockwise direction until brush 45' is opposite an insulated section of the commutator. Likewise, if a keyboard selection representative of the DOWN pushbutton is made a circuit is completed through brush 45' via segment 33' to rotate the commutator rings in a counterclockwise direction until the circuit is interrupted.

Commutator rings 26', 27', 28' and 30' and segments 31', 32', 33' and 34' are interconnected to an array of diodes via brushes 40', 41', 42', 43', 45' and 45a'. The diode array couples the commutator to transistor amplifier 51 (FIG. 5) including NPN transistors I-5, T-6 and T-7. The emitter electrode of each transistor is connected to negative terminal 56 of a direct current voltage supply. The collector electrode of transistor T-5 is connected to positive terminal 57 of the DC voltage supply via DN relay coil, diode D-21 and contacts UP-2. In a similar manner, the collector electrode of transistor T-7 is connected through UP relay coil, diode D-18 and contacts DN-5 to positive terminal 57. The collector electrode of transistor T-6 is connected to positive terminal 57 through SLO relay coil, resistor R-18 diode D-20 and either contacts DN-2 or contacts UP-1. The collector electrode of transistors T-5 and T-7 is also connected to the positive terminal via diodes D-17 and D-16, respectively, through relay coil AUX and diode D-19. Lastly, positive terminal 57 is connected through either contacts UP-1 or contacts DN-2, and contacts SLO-4 to the base of transistors T-7 and T-5 through diodes D-22 and D-29, and resistors R-19 and R-21, respectively.

Now referring to FIG. 6 an alternating current voltage is impressed across terminals 58 and 60. This voltage is rectified and thereby utilized to provide unidirectional current for motor armature A as well as the series and shunt sections of the field winding. Accordingly, the shunt field is continuously energized to provide the dynamic braking utilized by the present invention under normal running conditions. Armature A is connected across a diode bridge comprising diodes D-4, D-5, D-6 and D-7. The armature is also connected across a bridge comprising silicon controlled rectifiers SCR-3, SCR-4, SCR-5 and SCR-6. The control electrode of silicon controlled rectifier SCR-3 is connected to one side of the armature through resistor R-17 and contacts DN-4, whereas the control electrode of SCR-5 is connected to the other side of the armature through resistor R-16 and contacts UP-4. The control electrodes of 4 and SCR-6 are connected to a juncture between their anodes via resistor R-14 and contacts DN-3, and resistor R-15 and contacts UP-3, respectively.

A center tapped voltage divider comprising resistance R-5 is also connected across the armature terminals. Connected to the center tap of the divider is a series network comprising resistor R-13 and capacitor C-8. Connected to the juncture between R-13 and C-8 is neon lamp N-1 which is also connected at its opposite end to one end of the voltage divider as well as the other side of C-8. Neon lamp N-1 is operatively associated with a photoresistor element RX-1. This combination of elements is generally referred to as a Photomodule, and the two elements are imbedded in a common substance in operative relationship, i.e., when lamp N-1 is on radiant energy impinges upon photoresistor RX-1.

The AC potential is also impressed across a bridge comprising diodes D-1 and D-2 and silicon controlled rectifiers SCR-1 and SCR-2. The control electrodes of the latter two mentioned SCR's are connected via, resistor R-12 and diode D-15, and resistor R-11 and diode D-14, respectively, to a module referred to as a firing angle controller 61 which controls the phase angle at which the control electrodes for SCR-1 and SCR-2 are pulsed. Controller 61 operates in a conventional manner and will be described and incorporated into the network in further detail in the description of operation hereinafter.

Returning briefly to resistance RX-1, it is connected in a series with resistor R-3 which is connected to the control electrode of silicon controlled rectifier SCR-7. SCR-7 is connected to load resistance elements R-1 and R-2 and the combination of the SCR and the load elements are connected in series across the bridge comprising diodes D-4 through D-7 means of resistance R-4 or, alternatively, contacts DB.

Completing the basic structure of the FIG. 6 configuration, a relay coil STR is connected via contacts SLO 3 to armature A through the diode bridge elements D-6 or D-7 and D-4 or D-5. A further relay coil, DB, is connected in series with diodes D-11 or D-10, and D-12 and contacts STR-1 to junction J-2. The shunt field is shunted by capacitance elements C-1 and C-2 and coil DB is shunted by capacitor C-7.

In operation of the system described, the retrieval unit (FIGS. 1 and 2) is controlled for rapid access to the contents stored therein. Inasmuch as the invention relates to an improved motor control system, it becomes apparent that this particular unit is exemplary of the environment suitable for attaining the objectives discussed. The actual device or load bearing entity involved need not be of a similar nature from a standpoint of purpose or function. The general operation of unit 10 is initiated by selection of a particular carrier 18 by depressing a pushbutton at keyboard 48 (FIG. 7). The control system is then energized and conveyor 55 commences to advance carriers 18 along a predetermined oval path in a direction determined by the initial position of the selected carrier. The carrier will be advanced to the work station via the shortest distance of travel from its rest position. The keyboard command enables motor 54 to be energized by passing control current through commutator 50 to amplifier 51, which provides selective energization for control relays 52, which in turn operate the enabling circuits for the motor speed and power control circuits 53. The latter circuits permit motor 54 to be energized to drive conveyor 55 in concert with commutator 50 until such time as the selected position is sensed by the commutator, whereupon control relays 52 and motor speed and power controls 53 interact with commutator 50 to accurately stop the drive system.

More specifically, the circuitry of FIGS. 5 and 6 operates in the manner now to be described. Three principal conditions of operation will be discussed. Firstly, normal operation will be described, followed by a discussion of operation under overspeed conditions. Lastly, operation will be described under quick stop conditions.

Assuming that unit 10 is normal rest condition and a carrier selection is made at the keyboard which will cause the conveyor to drive the carriers in an up direction, then the UP pushbutton (FIG. 5) would in effect be depressed. This will bias the base of transistor T-7 via diode D-23 resistor R-19 and UP ring 27' of the commutator. Ring 27' is interconnected to segment 34' of the commutator by interconnecting wire 38'. This biasing of transistor T-7 turns the transistor on and establishes a current path through the emitter and collector from positive terminal 57 through contacts DN-1, diode D-18, and coil UP. A current path is alternatively provided through diode D-19, coil AUX, and diode D-16. The characteristics of relay AUX are such that it will pull in prior to relay UP. This enables any safety features to be properly conditioned prior to the operation of the drive mechanism. Now turning to FIG. 6, it is observed that contacts AUX are closed and all UP contacts are in their operating conditions, i.e., contacts UP-3 close and contacts UP-4 open.

At this point, the bridge comprising diodes D-1, D-2 and silicon controlled rectifiers SCR-2 and SCR-1 permits energization of the motor armature and series field in the following manner. Silicon controlled rectifiers SCR-1 and SCR-2 are fired in accordance with Firing Angle Controller 61 under conditions where the AUX contacts close. Variable resistor R-7 determines the firing angle by biasing unilateral switch SUS to provide pulses via D-14, R-11 and D-15, R-12 to the control electrodes of silicon controlled rectifiers SCR-1 and SCR-2. A current path is thereby provided between junctions J-1 and J-2 via SCR-6, armature A, silicon controlled rectifier SCR-3 and the series field. The motor commences to run at a starting speed determined by the R-C network of Firing Angle Controller 61 which controls the phase at which silicon controlled rectifiers SCR-1 and SCR-2 are operated. When the armature counter EMF reaches predetermined value, relay STR pulls in via contacts SLO-3, which remain in their normally closed state. Thus, contacts STR-1 and STR-2 are closed. The closure of contacts STR-1 shunts variable resistance R-7 and thereby changes the firing angle of pulses from unilateral switch SUS to bring the motor up to full speed. The closure of contacts STR-2 pulls in relay DB and accordingly opens contacts DB which are shunted across resistor R-4. The purpose of this latter resistance will be discussed in further detail hereinbelow.

Now turning to FIG. 5, under normal operating conditions where the motor has reached its operating speed, it will be noted that transistor T-7 is locked on by virtue of the biasing potential on the base via contacts SLO-4 (normally closed) and contacts UP-1 which have been closed under operation or relay coil UP. Therefore, when brush 45' is rotated off segment 34' to the insulated section 62 and ultimately to SLO segment 31', there will be no interruption of motor operation.

Thus, as segment 34' rotates with the commutator in a clockwise direction for an up command, brush 45' will in fact rotate through nonconductive sector 62 and then come in contact with segment 31', which is interconnected with SLO ring 28' by element 36'. Ring 28' in turn is connected via brush 42' to the base of transistor T–6 through diode D–25 and resistor R–20. This biases the base of transistor T– 6. Accordingly, T–6 is turned on by virtue of a current path through diode D–20, resistor R–18 and relay coil SLO. Insofar as other portions of FIG. 5 are concerned, the only change that takes place during the present operation is that transistor T–7 is no longer in a "locked-on" condition due to the opening of normally closed contacts SLO–4. Again referring to the circuit of FIG. 6, contacts SLO–1 go the open condition along with contacts SLO–3. Contacts SLO–2 are closed and the contacts STR–1 and STR–2 which were in the closed position now open as a result of the deenergization of relay coil STR, caused by normally closed contacts SLO–3 opening. Thus, under conditions where brush 45' is in contact with SLO segment 31', the motor begins to decelerate by virtue of the change in firing angle of silicon controlled rectifiers SCR–1 and SCR–2 along with the conjoint operation of load resistors R–1 and R–2 operating as a dynamic brake. These resistances operate as a braking load by virtue of current therethrough resulting from the closure of contacts SLO–2 to fire SCR–7 via its control electrode.

At this point, it should be briefly stated that the object is to accurately stop the relative motion of brush 45' at insulated portion 63 (also designated by STOP) between segments 31' and 32' (FIG. 5). Thus, with the armature speed having been reduced, the motor drives the system in a SLO condition until the relative position of brush 45' reaches the stop position at which time the UP, AUX, and SLO relays are deenergized. Capacitors C–4 and C–5 (FIG. 5) function as energy storage means and accordingly the AUX relay drops out prior to the SLO and UP relays. The values of the capacitors C–4 and C–5 essentially determine respective discharge times and accordingly the UP relay drops out subsequent to AUX, followed by the SLO relay.

In the FIG. 6 network, the AUX contacts are opened first at the stop position and thus the silicon controlled rectifiers SCR–1 and SCR–2 are turned off and no further potential is provided across the armature via junctions J–1 and J–2. This is followed by the dropping out of UP relay which accordingly reopens contacts UP–3 and closes contacts UP–4 to normal condition. A path is thus provided for the armature current to flow in the direction opposite to which it was flowing to normally drive the motor in a selected direction. Current now flows from the armature through silicon controlled rectifier SCR–5, the series field, contacts DB, diode D–4 and on to the other side of the armature to complete the path. This provides a dynamic braking path for the motor and aids in accurately stopping the conveyor at the preselected position determined by the relative position by brush 45', adjacent the appropriate insulated STOP segment of the commutator.

For the opposite condition to exist, i.e., request for a carrier that would by virtue of its rest position cause the conveyor to be driven in a down direction, the system operates in a similar manner with the UP and DOWN relays and associated elements being in effect interchanged insofar as their function is concerned. It should also be noted that SLO ring 30' is utilized under down operation rather than SLO ring 28' which was utilized in the above described operation.

A further and important feature of the present invention is presented in its ability to prevent a dangerous runaway situation. For example, in the unit shown, under typical unbalanced conditions when a loaded carrier reaches the top of the conveyor and starts its downward excursion in an increase in speed normally takes place if the diametrically opposite carrier is empty. In the present invention, armature voltage is impressed across R–5 and accordingly, the increased voltage resulting from the imbalance condition of the load is likewise present thereat. A selected portion of the total armature voltage is sensed by the center tap and thus the voltage across neon lamp N–1 increases proportionately when an unbalanced condition exists. By selection of a neon lamp with appropriate operating characteristics, it will turn on under conditions where motor speed exceeds a predetermined amount. Then, in turn, photoresistor RX–1 by nature will decrease in resistance rapidly and turn on silicon controlled rectifier SCR–7 by connecting armature A to the control electrode thereof, via diode D–6, resistor R–3 and energized resistor RX–1. Here again, the resistive load comprising resistors R–1 and R–2 would be shunted dynamically across the armature to provide opposing load until such time as the armature voltage returns to its normal operating potential. At that time, the reduced voltage, which is continuously sensed at voltage divider R–5, would turn off neon lamp N–1, and thereby deenergize resistor RX–1, thus switching off SCR–7 to disconnect the dynamic braking circuit from across the armature. The above described overspeed sensing control is preset by varying the position of the center tap on divider R–5.

The feature referred to above as quick stop condition presents itself where a power failure exists or the power to the operating portion of a machine is interrupted, e.g., emergency stop control. Under such conditions, it becomes highly desirable to prevent an abrupt stop of the operating mechanism. For example, if bottles or the like are stored for retrieval on the carriers, a sudden stop would in all probability upset them and possibly damage the contents as well as the actual containers. Regardless of the actual application, it is not necessary to stress the need for preventing a hasty deceleration while still not preventing operation of the system at the high speeds required for rapid access.

In the event motor energization is interrupted, contacts SIR–2 drop out along with the other contacts of relay STR. This interrupts the direct energization path for relay coil DB. Capacitance C–7 is shunted across coil DB which discharges stored energy momentarily and maintains coil DB energized for a short period of time to keep contacts DB open. Thus, the initial path for dynamic braking current as described above for normal stopping would not include contacts DB but alternatively would include resistor R–4. Thus, at initial quick stop conditions, the braking path would be through SCR–5, The SERIES FIELD, resistor R–4 and diode D–4. By this additional load resistance being instantaneously inserted, the actual dynamic braking effect will be reduced until such time as contacts DB actually close shunting resistance R–4 and thereby subsequently assisting in rapidly bringing the motor to a stop. The time relay which is the essential characteristic of this feature is accurately determinable by selection of element value to derive a time constant giving desired results depending on load conditions.

Many advantages of the present invention are implicitly and explicitly described above; however, it should be emphasized that serious damage to DC motor apparatus is prevented by this novel system. Furthermore, the system prevents dangerous runaway situations from materializing or existing. To this end, a safe efficient system is provided without sacrificing speed of operation which is always a prime consideration. The safety factor is not only important but necessary when due consideration is given to industrial safety requirements as well as practical requirements insofar as damaged media is concerned.

More specifically, an important aspect of the novel dynamic braking system of the present invention is that it is adapted to operate without shunt field excitation. This is true because the series field is used for a braking resistor, and accordingly, the armature supplies the necessary field current through the series field. This eliminates need for a mechanical brake or a permanent magnet motor. Without this feature, a dangerous situation would arise under conditions where the power fails with a heavy unbalanced conveyor load going down. Without power, no shunt field excitation exists and the conveyor could reach a dangerous speed. Therefore, it is important that braking be accomplished even without power. In the past, the approaches to this problem included a noisy and costly mechanical brake which is obviated by the present inventions.

Although a specific embodiment of the invention has been illustrated and described in detail by way of example, it is to be understood that the invention is not limited thereto. Various changes may be made in the design and arrangement of parts without departing from the spirit and scope of the invention, as will be readily understood by those skilled in the art.

We claim:

1. A system for operating a DC motor including a shaft, an armature and a field winding having one or more sections, said system comprising,
   a. an AC power source,
   b. rectification means connecting said power source to the armature and field winding for unidirectional energization thereof,
   c. means responsive to shaft rotation,
   d. said responsive means including rotatable means coupled to said shaft for positioning in increments proportional to said shaft rotation,
   e. a plurality of selection elements associated with said rotatable means at known increments for selection of desired incremental rotation,
   f. switching means operatively associated with said rectification means and said selection elements for controlling armature and field energization to drive said rotatable means to a selected position in accordance with shaft rotation,
   g. a resistive load,
   h. means for connecting said resistive load in series with one section of the field winding and said armature under conditions where said rotatable means is approaching said selected position, said one section of the field winding connected in series with said armature, a second section of the field winding connected in parallel with said armature, and
   i. said rectification means including a diode network coupling said parallel section of said field winding to said AC power source for providing pulsating direct current to said parallel section regardless of the energization of said series section.

2. A system for operating a DC motor including a shaft, an armature and a field winding having one or more sections, said system comprising,
   a. an AC power source,
   b. rectification means connecting said power source to the armature and field winding for unidirectional energization thereof,
   c. means responsive to shaft rotation,
   d. said responsive means including rotatable means coupled to said shaft for positioning in increments proportional to said shaft rotation,
   e. a plurality of selection elements associated with said rotatable means at known increments for selection of desired incremental rotation,
   f. switching means operatively associated with said rectification means and said selection elements for controlling armature and field energization to drive said rotatable means to a selected position in accordance with shaft rotation,
   g. a resistive load,
   h. means for connecting said resistive load in series with one section of the field winding and said armature under conditions where said rotatable means is approaching said selected position,
   i. overspeed sensing means for preventing shaft speeds in excess of a predetermined value, under random unbalanced load conditions, said overspeed sensing means including a voltage divider including first and second terminals connected across said armature, and a center tap, voltage responsive means connected to the center tap of said voltage divider and responsive to a predetermined amount of potential present across said armature,
   j. said connecting means further comprising gating means coupled to said voltage responsive means for connecting said resistive load to said armature under conditions where the speed exceeds said predetermined value, and
   k. said voltage responsive means comprising a neon lamp adapted to turn on at a predetermined potential corresponding to an overspeed condition.

3. A system for operating a DC motor including a shaft, an armature and a field winding having one or more sections, said system comprising,
   a. an AC power source,
   b. rectification means connecting said power source to the armature and field winding for unidirectional energization thereof,
   c. means responsive to shaft rotation,
   d. said responsive means including rotatable means coupled to said shaft for positioning in increments proportional to said shaft rotation,
   e. a plurality of selection elements associated with said rotatable means at known increments for selection of desired incremental rotation,
   f. switching means operatively associated with said rectification means and said selection elements for controlling armature and field energization to drive said rotatable means to a selected position in accordance with shaft rotation,
   g. a resistive load,
   h. means for connecting said resistive load in series with one section of the field winding and said armature under conditions where said rotatable means is approaching said selected position,
   i. overspeed sensing means for preventing shaft speeds in excess of a predetermined value, under random unbalanced load conditions, said overspeed sensing means including a voltage divider including first and second terminals connected across said armature, and a center tap, voltage responsive means connected to the center tap of said voltage divider and responsive to a predetermined amount of potential present across said armature,
   j. said connecting means further comprising gating means coupled to said voltage responsive means for connecting said resistive load to said armature under conditions where the speed exceeds said predetermined value,
   k. said voltage responsive means comprising a source of radiant energy adapted for energization at a predetermined potential corresponding to an overspeed condition, and
   l. a photoresistor disposed in operative relationship with said energy source and connected in circuit with gating means, whereby resistance of said photoresistor decreases a substantial amount under conditions where said energy source is energized to effectively connect said resistive load.

4. A system as set forth in claim 3 where in said source of radiant energy comprises a neon lamp.

5. A system for operating a DC motor including a shaft, an armature and a field winding having one or more sections, said system comprising,
   a. an AC power source,
   b. rectification means connecting said power source to the armature and field winding for unidirectional energization thereof,
   c. means responsive to shaft rotation,
   d. said responsive means including rotatable means coupled to said shaft for positioning in increments proportional to said shaft rotation,
   e. a plurality of selection elements associated with said rotatable means at known increments for selection of desired incremental rotation,
   f. switching means operatively associated with said rectification means and said selection elements for controlling armature and field energization to drive said rotatable means to a selected position in accordance with shaft rotation, g. a resistive load, h. means for connecting said resistive load in series with one section of the field winding and said armature under conditions where said rotatable means is approaching said selected position, i. said connecting means comprising a device including a cathode, an anode and a control electrode, which device is adapted to provide a low impedance path between said cathode and said anode in response to the presence of appropriate voltage at said control electrode, said cathode and anode interposed in circuit with said armature and said resistive load, j. overspeed sensing means comprising, a voltage divider including a center tap and first and second terminals connected across said armature, voltage responsive means connected to the center tap of said voltage divider and responsive to a predetermined amount of potential present across said armature, k. means for coupling said voltage responsive means to said control electrode whereby said load resistance is connected to said armature under conditions where said speed exceeds a preselected value, and l. said voltage responsive means comprising a neon lamp adapted to turn on at a predetermined potential corresponding to an overspeed condition.

6. A system for operating a DC motor including a shaft, an armature and a field winding having one or more sections, said system comprising, a. an AC power source, b. rectification means connecting said power source to the armature and field winding for unidirectional energization thereof, c. means responsive to shaft rotation, d. said responsive means including rotatable means coupled to said shaft for positioning in increments proportional to said shaft rotation, e. a plurality of selection elements associated with said rotatable means at known increments for selection of desired incremental rotation, f. switching means operatively associated with said rectification means and said selection elements for controlling armature and field energization to drive said rotatable means to a selected position in accordance with shaft rotation, g. a resistive load, h. means for connecting said resistive load in series with one section of the field winding and said armature under conditions where said rotatable means is approaching said selected position, i. said connecting means comprising a device including a cathode, an anode and a control electrode, which device is adapted to provide a low impedance path between said cathode and said anode in response to the presence of appropriate voltage at said control electrode, said cathode and anode interposed in circuit with said armature and said resistive load, j. overspeed sensing means comprising, a voltage divider including a center tap and first and second terminals connected across said armature, voltage responsive means connected to the center tap of said voltage divider and responsive to a predetermined amount of potential present across said armature, k. means for coupling said voltage responsive means to said control electrode whereby said load resistance is connected to said armature under conditions where said speed exceeds a preselected value, l. said voltage responsive means comprising a source of radiant energy adapted for energization at predetermined potential corresponding to an overspeed condition, and m. said means for coupling comprising a photoresistor in operative relationship with said radiant energy source, whereby resistance of said photoresistor decreases a substantial amount under conditions where said source is energized.

7. A system as set forth in claim 6 wherein said radiant energy source comprises a neon lamp.

8. A system as set forth in claim 6 wherein said photoresistor is connected between said control electrode and said armature.

9. A system for operating a DC motor including a shaft, an armature and a field winding having one or more sections, said system comprising, an AC power source, b. rectification means connecting said power source to the armature and field winding for unidirectional energization thereof, c. means responsive to shaft rotation, d. said responsive means including rotatable means coupled to said shaft for positioning in increments proportional to said shaft rotation, e. a plurality of selection elements associated with said rotatable means at known increments for selection of desired incremental rotation, f. switching means operatively associated with said rectification means and said selection elements for controlling armature and field energization to drive said rotatable means to a selected position in accordance with shaft rotation, g. a resistive load, h. means for connecting said resistive load in series with one section of the field winding and said armature under conditions where said rotatable means is approaching said selected position, said one section of the field winding connected in series with aid armature, and a second section of the field winding connected in parallel with said armature, i. said rectification means including a diode network coupling said parallel section of said field winding to said AC power source for providing pulsating direct current to said parallel section, j. means for interrupting said AC power source, and k. means for connecting said series section in circuit with resistive impedance and the armature under conditions where said AC power source is interrupted.

10. A system as set forth in claim 9 wherein means are provided to shunt said resistive impedance under conditions where the armature voltage has decreased below a value corresponding to a predetermined shaft speed.